United States Patent [19]
Blyler, Jr. et al.
[11] Patent Number: 4,984,864
[45] Date of Patent: Jan. 15, 1991

[54] OPTICAL SPLITTER HAVING A SELF-CONTAINED OPTICAL SOURCE

[75] Inventors: Lee L. Blyler, Jr., Basking Ridge, N.J.; Gary J. Grimes, Thornton, Colo.
[73] Assignee: AT&T Bell Laboratories, Murray Hill, N.J.

[21] Appl. No.: 454,085
[22] Filed: Dec. 21, 1989
[51] Int. Cl.[5] .................... G02B 6/28; H04J 1/00
[52] U.S. Cl. .................... 350/96.16; 350/96.29; 350/96.24; 350/96.34; 370/3
[58] Field of Search .................... 350/96.15, 96.16, 96.20, 350/96.22, 96.29, 96.30, 96.32, 96.34; 250/227.11; 370/1, 3

[56] References Cited

U.S. PATENT DOCUMENTS 3,756,688 9/1973 Hudson et al. .............. 350/96.16 X
3,874,781 4/1975 Theil .............. 350/96.16
4,169,656 10/1979 Hodge .............. 350/96.15
4,198,118 4/1980 Porter .............. 350/96.16
4,212,512 7/1980 Hodge .............. 350/96.15
4,484,794 11/1984 Witte .............. 350/96.16
4,913,508 4/1990 Blyler, Jr. et al. .............. 350/96.16

*Primary Examiner*—Brian Healy
*Attorney, Agent, or Firm*—John C. Moran

[57] ABSTRACT

An optical splitter having a self-contained optical source with the optical core of the splitter being substantially numerical aperture matched to the optical source and to optical fibers connected to the splitter. By matching numerical apertures, efficient transfer of optical energy is achieved between the optical source and the connected optical fibers in spite of refractive index mismatch between the optical core and the connected optical fibers. The splitter is fabricated by inserting the optical source and optical fibers into a rigid cladding structure and filling the rigid cladding structure with a polymer which after curing becomes an optical core for communicating light from the optical source to the optical fibers.

12 Claims, 2 Drawing Sheets

OPTICAL FIBERS 304
OPTICAL SOURCE 305
OPTICAL MIXING CORE 302
OPTICAL SOURCE 301
CLADDING STRUCTURE 303

OPTICAL SPLITTER HAVING A SELF-CONTAINED OPTICAL SOURCE

TECHNICAL FIELD

The present invention relates to the transmission of light in an optical system and, in particular, to an optical splitter used in such a system.

BACKGROUND OF THE INVENTION

In many optical local area networks (LAN) and optical backplanes that have a bus-type architecture, an optical repeater receives and combines optical signals from optical transmitters in system nodes, as well as amplifies and individually retransmits signals to optical receivers in the system nodes. FIG. 1 illustrates such a prior art optical transmission system. Nodes 106 through 110 transmit and receive optical signals to and from optical repeater 100 and optical fibers 130 through 139. Specifically, optical repeater 100 receives and combines optical signals via optical fibers 135 through 139 and redistributes these optical signals via optical fibers 130 through 134. Optical combiner 115 receives and combines the optical signals; whereupon components 116, 117, and 118 electrically process the combined signal. Optical unit 123 then converts the combined electrical signals to an optical signal and transfers it to optical splitter 124 via optical link 140. Two problems exist due to the fact that optical unit 123 is separate from optical splitter 124. The first problem is the loss of optical energy due to the interconnections of optical splitter 124 and optical unit 123 to optical link 140 by light reflections in the air dielectric interfaces at the interconnections. The second problem is the cost of providing these optical connections.

SUMMARY OF THE INVENTION

The aforementioned problem is solved and a technical advance is achieved in the art by an optical splitter having a self-contained optical source with the optical core of the splitter being substantially numerical aperture matched to the optical source and to optical fibers connected to the splitter. By matching numerical apertures, efficient transfer of optical energy is achieved between the optical source and the connected optical fibers in spite of refractive index mismatch between the optical core and the connected optical fibers. Advantageously, the splitter is fabricated by inserting the optical source and optical fibers into a rigid cladding structure and filling the rigid cladding structure with a polymer which after curing becomes the optical core.

In one embodiment in accordance with the invention, the cladding structure is a fluorinated ethylene-propylene copolymer tube and the optical core material is a thermally-curable dimethyl siloxane resin. The optical source is a light emitting diode (LED), and the optical fibers are plastic-clad silica fibers. Advantageously, the numerical aperture differences are adjusted to less than 20%.

In another embodiment in accordance with the invention, two light sources are inserted into the optical core to be used for wavelength division multiplexing or for increased reliability.

Other and further aspects of the present invention will become apparent during the course of the following description and by reference to the accompanying drawing.

BRIEF DESCRIPTION OF THE DRAWING

Referring now to the drawing.

DETAILED DESCRIPTION

Figure 1:
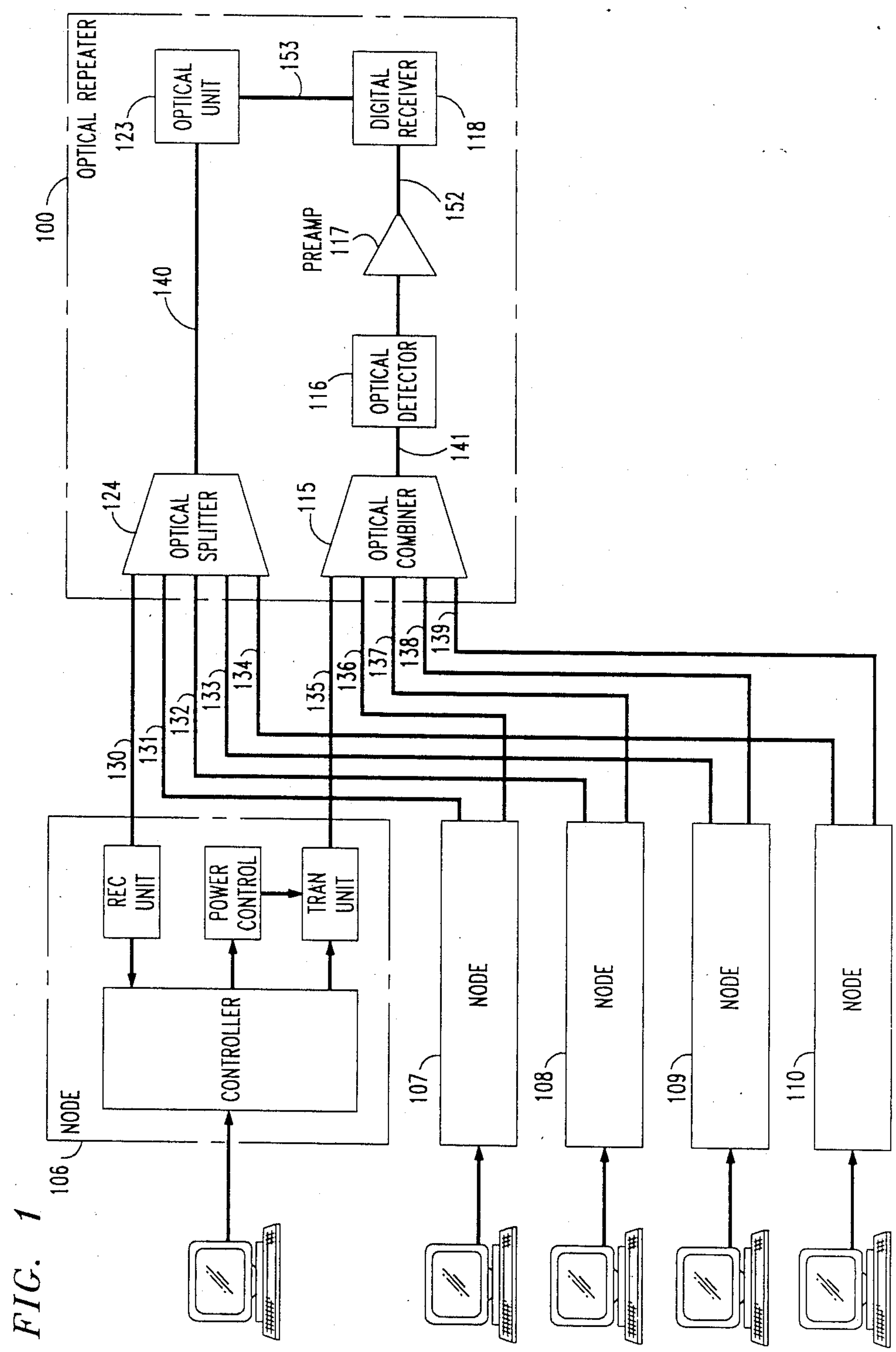
FIG. 1 illustrates a prior art optical transmission system.
Figure 2:
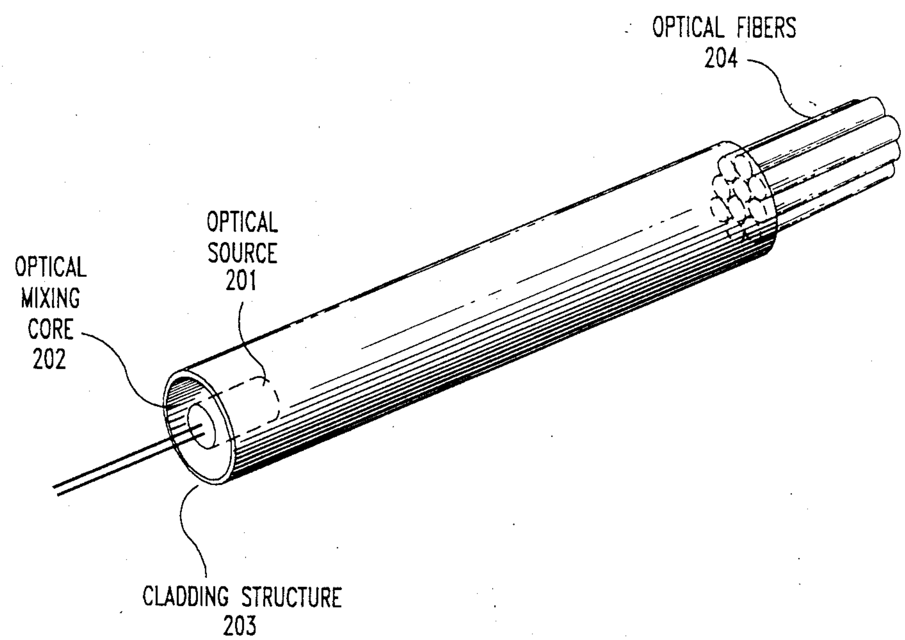
FIG. 2 illustrates an optical splitter in accordance with the invention.

FIG. 2 illustrates an embodiment in accordance with the invention in which a radiation source (illustratively optical light source 201) is an integral part of optical splitter 200. An optical splitter is an optical device for distributing optical signals to a plurality of optical fibers. Optical splitter 200 comprises cladding structure 203, optical mixing core 202, and optical light source 201 with attached optical fibers 204. For an efficient splitter design the total core cross-sectional area of optical fibers 204, optical light source 201 and optical mixing core 202 is significant. In particular, there must be substantial matching of total core area between optical mixing core 202 and the total of optical fibers 204; otherwise, inefficient distribution of light energy results. To satisfy this matching criterion, the total core area of optical fibers 204 should be a minimum of 50% of the maximum cross-sectional area of optical mixing core 202.

The numerical aperture of light source 201 in core material 202 should be no more than 20% larger than those of optical fibers 204 or than that of the optical mixing core 202. (Numerical aperture is defined in N. S. Kapany. *Fiber Optics, Principles and Applications*, Academic Press, New York, 1967, pp. 7–9.) In addition, the numerical aperture of optical mixing core 202 should be no more than 20% larger than that of optical fibers 204. Larger differences generally lead to unacceptable light energy transfer efficiencies of less than 65%. Numerical aperture matching has a substantial likelihood, depending on the materials selected, of producing large (on the order of 0.1) refractive index differences between optical mixing core 202 and the cores of optical fibers 204. Most significantly, we have found that the losses obtained even with this refractive index mismatch are acceptable if the numerical aperture mismatch is limited. Indeed, refractive index differences as large as 0.1 (provided numerical aperture differences are limited) still allow transfer efficiencies higher than 99%. This percentage is based on reflection losses only.

In one preferred embodiment of the invention, splitter 200 as shown in FIG. 2 is fabricated in the following manner. Optical fibers 204 are a collection of 19 fibers which are illustratively Ensign-Bickford Optics Company Type 200/230 HCS® (hard clad silica) fibers. These fibers are basically fluoroacrylate-clad silica fibers having a 200 micron (μm) diameter core and a cladding 230 μm in outside diameter. Each of the 19 fibers is manually cleaved utilizing a Deutsch DWR-1903-01 cleaving tool. Each fiber has an extruded external jacket of ethylene-tetrafluoroethylene copolymer which is removed in the region to be cleaved utilizing a microstrip tool. After cleaving, the jacket is further removed for a distance of 1 ½ inches from the cleaved end. The cleaved end of each fiber is inspected with a Newport Research Corporation Model F-IM2 fiber micro-interferometer. The resulting interferometric data is monitored to insure clean, cleaved angles of approximately 90°.

Light source 201 may advantageously be an 820 nm light emitting diode (LED) of 1 mwatt of power. To form rigid cladding structure 203, the ends of a 4 inch length of perfluorinated ethylene/propylene copolymer tubing are cut 90°to the long axis and flared to expedite insertion of the fibers. The tube has an inside diameter of approximately 0.042 inch and a wall-thickness of 0.016 inches. The 19 silica fibers are treated with Falcon Dust-off having a Stat-Off-II alpha particle emitter attachment to remove any residue of debris from the cleaving and polishing processes. Light source 201 is treated in a similar manner.

The aforementioned tube is taped with transparent tape to a flat Mylar ® surface during fabrication. The fibers are inserted one at a time into one end of cladding structure 203. Utilizing an optical microscope, the ends of the fibers are aligned to within one-half the fiber's outside diameter and positioned so that their ends are approximately three quarters of an inch into the tube. After alignment the fibers are taped to the Mylar ® sheet.

Optical mixing core 202 is fabricated in the following manner. A two-part silicone resin (KE 103) is purchased from Shin-Etsu Chemical Company. The resin materials include a vinyl-terminated poly(dimethylsiloxsane) material and a proprietary silane cross-linking material catalyzed by a platinum compound. The two parts are mixed in a 20:1 ratio by weight as instructed by the manufacturer and stirred with a magnetic stirrer. The material is then degassed under a one Torr vacuum and after degassing is inserted into a 10 cc syringe having an 18 gauge needle.

The needle is inserted approximately ½ inch into the end of the tube opposite the fibers. The silicone material is injected into the tube so that it flows through the fiber collection, filling the interstices and exiting the tube end. The needle is then slowly removed while maintaining the injection pressure so that the tube is entirely filled without the introduction of air bubbles. Additional material is spread onto the exposed portion of the fibers which previously had the extruded copolymer jacket removed. Light source 201 is then inserted approximately three quarters of an inch into the unoccupied end of the tube. Further, light source 201 is centered in the tube. This insertion is done relatively quickly so that air bubbles are not injected. The silicone resin is allowed to cure at room temperature for approximately 18 hours.

Light source 201 is then energized, and the light power emanating from each of optical fibers 204 is then measured with a detector. The sum of the power from these optical fibers is then compared with the previously measured output from light source 201 which is measured before having been inserted into mixing core 202 by a photodetector (Photodyne Model 22 XL).

Figure 3:
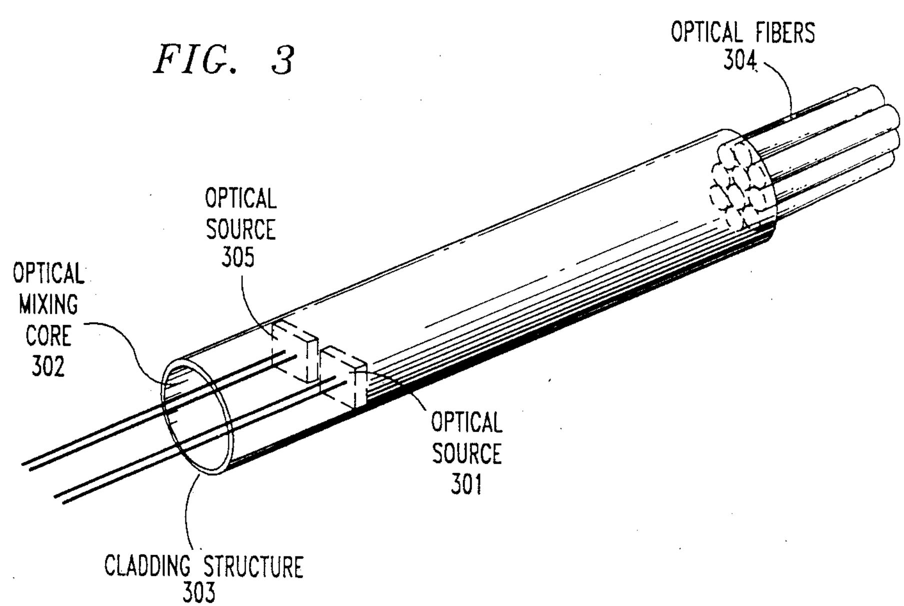
FIG. 3 illustrates another optical splitter in accordance with the invention.

FIG. 3 illustrates another optical splitter having optical sources 301 and 305 optically interconnected to optical fibers 304 via optical mixing core 302. By having optical sources 301 and 305 generate different wavelengths of light, optical splitter 300 is usable for wavelength division multiplexing. Alternatively, reliability of the optical splitter can be enhanced by having optical sources 301 and 305 generate the same wavelength light and using one as a backup for the other.

Other embodiments of the invention based on different materials are possible by one skilled in art using the following principles. The numerical aperture of optical mixing core 202 is determined by the refractive index of the mixing region core and the refractive index of its surrounding cladding. Flexibility in adjusting the numerical aperture is generally obtained by adjusting the composition of the mixing core material. Polymers yielding a wide range of refractive indices are available and allow the matching of numerical apertures. For example, resins such as silicones, e.g., dimethyl siloxanes, acrylics, e.g., poly(methyl methacrylate), polyesters, polyurethanes and epoxies yield refractive indices in the range of 1.39 to 1.57. Additionally, the optical mixing core should have a transmission loss of less than 1 dB over the length of the optical mixing region.

A cladding structure (such as structure 203) is closed around the optical fibers (such as fibers 204) and then the mixing core is filled with a suitable resin such as silicone RTV resin, (room temperature vulcanized) Shin-Etsu KE 103. Other resins are cured by thermal or ultraviolet techniques. (The curing of a polymer by thermal or ultraviolet techniques is extensively discussed in F. W. Billmeyer, Jr., *Textbook of Polymer Science*, 2nd ed. Wiley-Interscience, New York, 1971, Chapter 16, and *U. V. Curing: Science and Technology*, S.P. Pappas editor, Technology Marketing Corp., Norwalk, Conn. 1980.) The curing of the polymer produces an appropriate optical medium which functions as an adhesive to maintain the appropriate geometric relationship between the optical fibers, and also maintains light source 201 in the correct position.

The cladding material (which comprises the cladding structure) for the optical mixing region is chosen to yield structural integrity and (in conjunction with the mixing core material) to yield the numerical aperture match previously discussed. Exemplary materials for the cladding are polymers, e.g., perfluorinated ethylene/propylene copolymer and poly(vinylidene fluoride), poly(4-methyl penetene-1), poly(methyl methacrylate), and polyethylene.

The structure of the optical fibers (such as optical fibers 204 utilized is not critical, provided the cladding thickness is small compared with the core radius. Typically the cladding thickness should be less than 20% of the core effective radius. (The effective radius is the radius of a circle having the same area as the core.) Polymer-clad glass fiber such as described by W. B. Beck and M. H. Hodge, "Laser Focus," December 1984, and fibers having plastic cores such as described by R. W. Lay, "Electronic Engineering Times", January 5, 1987, page 35, are useful. Generally, large core plastic fibers are easier to manipulate than those having a silica glass composition. However, as previously discussed, the composition of the fiber is not critical, and large diameter, glass core fibers are not precluded.

It is to be understood that the above-described embodiments are merely illustrative of the principles of the invention and that other arrangements maybe devised by those skilled in the art without departing from the spirit and scope of the invention. In particular, the optical fibers may be grouped in arrangement other than circular bundles.

We claim:

1. An optical device for distributing optical signals to a plurality of optical fibers connected to said optical device, and said optical device comprising;

a rigid structure forming an optical cladding;

an optical core formed within said rigid structure;

a radiation source embedded in said optical core for transmitting radiation energy to each of said plurality of optical fibers;

the numerical aperture of said optical core being within about 20% of both the numerical aperture of said plurality of said optical fibers and the numerical aperture of said radiation source; and total core cross-sectional area of said optical fibers matching within a minimum of 50% of the cross-sectional area of said optical core.

2. The device of claim 1 wherein said optical core comprises a polymer material chosen from the group consisting of silicones, acrylics, polyesters, polyurethenes and epoxies.

3. The device of claim 2 wherein said rigid structure comprises a polymer material.

4. The device of claim 1 wherein said radiation source is a light emitting diode.

5. An optical device for distributing optical signals, and said optical device comprising;

a rigid structure forming an optical cladding;

an optical core formed within said rigid structure;

a plurality of optical fibers connected to said optical core;

a radiation source embedded in said optical core for transmitting radiation energy to each of said plurality of optical fibers;

the numerical aperture of said optical core being within about 20% of both the numerical aperture of said plurality of said optical fibers and the numerical aperture of said radiation source; and total core cross-sectional area of said optical fibers matching within a minimum of 50% of the cross-sectional area of said optical core.

6. The device of claim 5 wherein said optical core comprises a material chosen from the group consisting of silicones, acrylics, polyesters, polyurethenes and epoxies.

7. The device of claim 6 wherein said rigid structure comprises a material chosen from fluoropolymers.

8. The device of claim 5 wherein said radiation source is a light emitting diode.

9. An optical device for distributing optical signals to a plurality of optical fibers connected to said optical device, and said optical device comprising;

a rigid structure forming an optical cladding;

an optical core formed within said rigid structure;

a plurality of radiation sources embedded in said optical core for transmitting radiation energy to each of said plurality of optical fibers;

the numerical aperture of said optical core being within about 20% of both the numerical aperture of said plurality of said optical fibers and the numerical aperture of said radiation source; and total core cross-sectional area of said optical fibers matching within a minimum of 50% of the cross-sectional area of said optical core.

10. The device of claim 9 wherein said optical core comprises a polymer material chosen from the group consisting of silicones, acrylics, polyesters, polyurethenes and epoxies.

11. The device of claim 10 wherein said rigid structure comprises a polymer material.

12. The device of claim 9 wherein said plurality of radiation sources comprises two light emitting diodes.

* * * * *